United States Patent [19]
Cash et al.

[11] Patent Number: 6,024,860
[45] Date of Patent: Feb. 15, 2000

[54] SYSTEM FOR ELECTROCHEMICAL DECOMPOSITION OF SODIUM AZIDE

[75] Inventors: Peter Philip Cash; Ralph Edward Behrens, both of Cedar City, Utah; Raymond Charles Rhees, Boulder City, Nev.

[73] Assignee: American Pacific Corporation, Las Vegas, Nev.

[21] Appl. No.: 08/911,982

[22] Filed: Aug. 15, 1997

[51] Int. Cl.[7] ............................... C25B 9/00; C25B 15/00
[52] U.S. Cl. ..................... 205/615; 205/633; 205/687; 204/278
[58] Field of Search .................... 205/615, 633, 205/687; 204/278

[56] References Cited

U.S. PATENT DOCUMENTS

| | | | |
|---|---|---|---|
| 3,953,582 | 4/1976 | Astrauskas et al. | 423/410 |
| 4,004,994 | 1/1977 | Andrus | 204/149 |
| 4,189,362 | 2/1980 | Dotson | 204/149 |
| 4,236,982 | 12/1980 | Polson | 204/116 |
| 4,774,156 | 9/1988 | Bones et al. | 429/103 |
| 5,073,273 | 12/1991 | Gupta et al. | 210/760 |
| 5,250,161 | 10/1993 | Chin et al. | 210/131 |
| 5,326,443 | 7/1994 | Hilbig | 204/278 |
| 5,423,454 | 6/1995 | Lippman et al. | 222/1 |
| 5,433,932 | 7/1995 | Clausen et al. | 423/208 |
| 5,457,265 | 10/1995 | Heubner et al. | 588/246 |

*Primary Examiner*—Arun S. Phasge
*Attorney, Agent, or Firm*—Smith, Gambrell & Russell

[57] ABSTRACT

A process and an apparatus for electrochemical decomposition of sodium azide in aqueous alkaline solutions form sodium hydroxide, ammonia, nitrogen, and oxygen. The apparatus contains five major parts, which are (1) an electrolyzer which contains one or more cell units, (2) a rectifier which supplies D.C. electrical current to the electrolyzer, (3) a tank which holds the electrolyte (containing sodium hydroxide and sodium azide) needed to be processed in the electrolyzer, (4) a vacuum which can remove off gases generated by electrolysis in the electrolyzer, and (5) a recovery system which can further separate off gases. It is optional to add a pump in between the tank and the electrolyzer to be used for filling, mechanical agitation, or recycle. The process includes (1) transferring the aqueous solution containing the sodium azide to the electrolyzer, (2) subjecting the aqueous solution to electrolytic action to decompose the sodium azide and to generate off gases including nitrogen, oxygen, and ammonia, and (3) removing off gases. The off gases can also be removed by vacuum and recovered separately in a recovery system.

26 Claims, 1 Drawing Sheet

SYSTEM FOR ELECTROCHEMICAL DECOMPOSITION OF SODIUM AZIDE

BACKGROUND OF THE INVENTION

1. Field of the Invention

This invention relates to a process of electrochemically decomposing sodium azide, and, more particularly, to a method of electrochemically decomposing sodium azide in aqueous alkaline solutions to form sodium hydroxide, ammonia, nitrogen, and oxygen. The invention further relates to an apparatus for the electrolytic reduction of sodium azide.

2. Description of the Related Art

Sodium azide has been widely used in the automotive as well as other manufacturing industries. The facilities that use sodium azide often generate aqueous alkaline side streams containing this chemical which must be removed or chemically altered before waste water streams can be discharged from the facilities.

The sodium azide manufacturing process also generates an aqueous alkaline side stream containing a high concentration of sodium hydroxide (up to 60% of sodium hydroxide on a weight basis) and a low concentration of sodium azide (approximately 2% on a weight basis). The sodium hydroxide generated from this side stream can be sold as a product only if the sodium azide in this side stream has first been removed or chemically changed to a non-hazardous material.

Azide compounds in aqueous solutions are typically decomposed by treatment with chemicals, electrolysis, ultraviolet light, or ozonation. Most of the methods dealing with azide decomposition have severe limitations because they are hazardous, expensive, inefficient, of limited applicability, and because they generate hazardous waste. Some of the methods further require operation at extremely high temperature and/or in solutions with low to moderate pH, which methods are not suitable for the decomposition of sodium azide in aqueous alkaline side streams.

Chemical decomposition of azide often generates unwanted hazardous waste. For instance, Heubner et al. (U.S. Pat. No. 5,457,265) describe a method that involves oxidative degradation of azide by treating the azide-containing solutions with an iodine solution in the presence of iodide and a thiosulfate. Although Heubner's invention is said to work well at an extremely low concentration of azides, it is not suitable for treating aqueous alkaline side streams because the chemicals used in the process, namely, iodine and thiosulfate, would further contaminate the waste stream.

Electrolytic reduction of azide compounds is another commonly used method for the treatment of azide compounds in aqueous solutions. For example, Andrus (U.S. Pat. No. 4,004,994) describes an electrochemical apparatus that utilizes carbonaceous particles (including carbon itself, charcoal, graphite, and pelleted forms of such carbonaceous materials) to form a solid particulate bed. Azide, a nonmetallic ionic contaminant, can be removed from the aqueous liquid by passing the liquid to be treated into the base of a vertically disposed treatment zone containing the solid particulate bed which forms a medium of low electrical conductivity. The treatment zone is formed by a cylindrical electrode and at least one internal electrode axially disposed within the cylindrical electrode. The liquid, free of contaminants, is then removed from the top of the treatment zone. Andrus' process, however, is not suitable for the treatment of contaminants in highly alkaline solutions because the carbonaceous particles would be subjected to significant degradation and oxidation which would contaminate the solution being treated.

Polson (U.S. Pat. No. 4,236,982) describes an electrolytic process of removing lead azide in an aqueous alkaline electrolyte containing 10% to 20% (weight basis) of sodium hydroxide, 0.2%–0.6% of rosin powder, and 5% of sodium-potassium tartrate. Although azide can be decomposed and converted to nitrogen gas at the anode of the electrolytic cell, the main purpose of the Polson process is to destroy lead azide by plating lead at the cathode. Also, the Polson process requires operation at a fairly high temperature (about 180° F.) which may create potential hazards. In fact, the Polson process is specially designed to remove a large quantity of lead azide in the electrolyte. There is no indication that Polson's process can be effective to reduce the concentration of azide compounds in the solution to a non-detectable level as in the present invention in part because the operation conditions may not be useful in a lead-free solution. For example, the current density preferred in Polson is 0.046 to 0.085 amp per square inch. Although higher current densities can be used to increase yield, according to Polson the quality of lead produced at these high densities is diminished. The deposition of lead would be detrimental to cathodes used according to the invention and especially a cathode in contact with ™Raney Nickel catalysts.

There are also several other reports relating to the electrochemical treatment of specific types of electrolyte where sodium azide is incidentally decomposed in the process. For example, Bones et al. (U.S. Pat. No. 4,774,156) provide a rechargeable electrochemical cell where sodium azide is employed to generate nitrogen gas which would pressurize the electrode compartments to force liquid into the electrode chambers. Bones et al.'s invention requires extremely high temperature (320° C.) to decompose the sodium azide. Sodium azide is not the targeted chemical to be removed from the electrolyte in Bones' system. Lippman et al. (U.S. Pat. No. 5,423,454) describe another electrochemical process for the generation of a gas to form an internal pressure to dispense a product. A water soluble azide (e.g., sodium azide) is used to generate nitrogen gas in Lippman's process. The inventions described by Bones and Lippman, although both involving the decomposition of sodium azide, are not intended to be used for the removal of sodium azide from the solution since sodium azide is one of the reactants which have to be added to the systems.

Ozonation is also a popular way of removing azide compounds from gaseous and aqueous waste. For example, Clausen et al. (U.S. Pat. No. 5,433,932) and Gupta et al. (U.S. Pat. No. 5,073,273) both describe methods of treating gas generating material waste that contains alkali metal azides (e.g., sodium azide) with ozone gas to oxidize the alkali metal azide to nitrogen and alkali metal nitrate. However, ozonation has to be carried out at a low pH (10.0–12.5). Therefore, it would not be feasible for the treatment of sodium azide in highly alkaline solutions.

It is therefore an object of the invention to electrochemically decompose sodium azide in an efficient way and to recover or remove chemicals from waste water streams.

SUMMARY OF THE INVENTION

The present invention relates to a method and an apparatus for electrochemical decomposition of sodium azide in aqueous alkaline solutions to form sodium hydroxide, ammonia, nitrogen, and oxygen. The aqueous alkaline solutions pertinent to this invention include waste side streams from the automotive and manufacturing industries and aqueous alkaline side streams from the sodium azide manufacturing process. The process of the invention converts sodium azide present in aqueous alkaline solutions to a nonhazardous material (e.g., nitrogen and oxygen) and to useful products (e.g., ammonia and sodium hydroxide) so that the solutions can be disposed of in an environmentally safe way.

The above and other objects of the invention can be achieved by a method comprising (1) transferring the aqueous solution containing the sodium azide to an electrolyzer, (2) subjecting the aqueous solution to electrolytic action to decompose the sodium azide and to generate off gases including nitrogen, oxygen, and ammonia, and (3) removing off gases.

In another aspect of the invention, the off gases are removed and $NH_3$ is recovered separately in a recovery system. Such means for removal of off gas includes vacuum pumps, blowers or eductors.

Another feature of this invention is an apparatus comprising (1) an electrolyzer which contains one or more cell units, (2) a rectifier which supplies D.C. electrical current to the electrolyzer, (3) a tank which holds the electrolyte (containing sodium hydroxide and sodium azide) needed to be processed in the electrolyzer, (4) a removing means which can remove off gases generated by electrolysis in the electrolyzer, and (5) a recovery system which can further separate off gases and which can include (a) off-gas scrubbing equipment including a scrubbing column and scrubbing solution such as water for treating gases, (b) a means for discharging nitrogen and oxygen and (c) a means for collecting ammonia in water. It is optional to add at least one pump between the tank and the electrolyzer. Such pump(s) can be used for filling, mechanical agitation, or recycle and for regulating electrolyte flow and control. The recovery system can include a vacuum pump or blower and a vacuum pump exhaust.

The method and apparatus described in this invention differ from prior art in the following aspects:

First, the method and apparatus described in this invention can effectively carry out electrochemical decomposition of sodium azide in conditions where the sodium azide concentration in the solution is fairly low and the pH of the solution is extremely high. In contrast, most of the prior art inventions require either low to moderate pH or substantial amounts of azide for reaction. They are not suitable for processing an aqueous alkaline solution containing low sodium azide concentration at extreme alkaline conditions as in the present invention.

Second, the method described in this invention does not require the adjustment of the buffered system nor the addition of any chemical reagents. In contrast, most of the prior art inventions require either an addition of chemicals or an adjustment of the buffered system (for example, in Heubner et al.'s method, iodine and thiosulfate are the added chemicals necessary for azide decomposition and the reaction is best carried out in a buffered solution at pH 6–9).

Third, the hazard of storing hydrogen gas is avoided in the present invention because the hydrogen source comes from the water from the process solution.

Fourth, other processes include ozonation (e.g. Clausen and Gupta described earlier) or ultraviolet light treatment. There is no requirement for expensive ultraviolet light or ozone-generating equipment in the present invention.

Finally, the method used in this invention can be carried out at ambient temperature. In fact, testing has shown that temperature effects were insignificant on a system operating between about 35–75° C. This result is in contrast to most of the prior art inventions which require fairly high temperatures to operate.

BRIEF DESCRIPTION OF THE DRAWING

The present invention will be further understood with reference to the drawing, wherein.

DETAILED DESCRIPTION OF THE INVENTION

Figure 1:
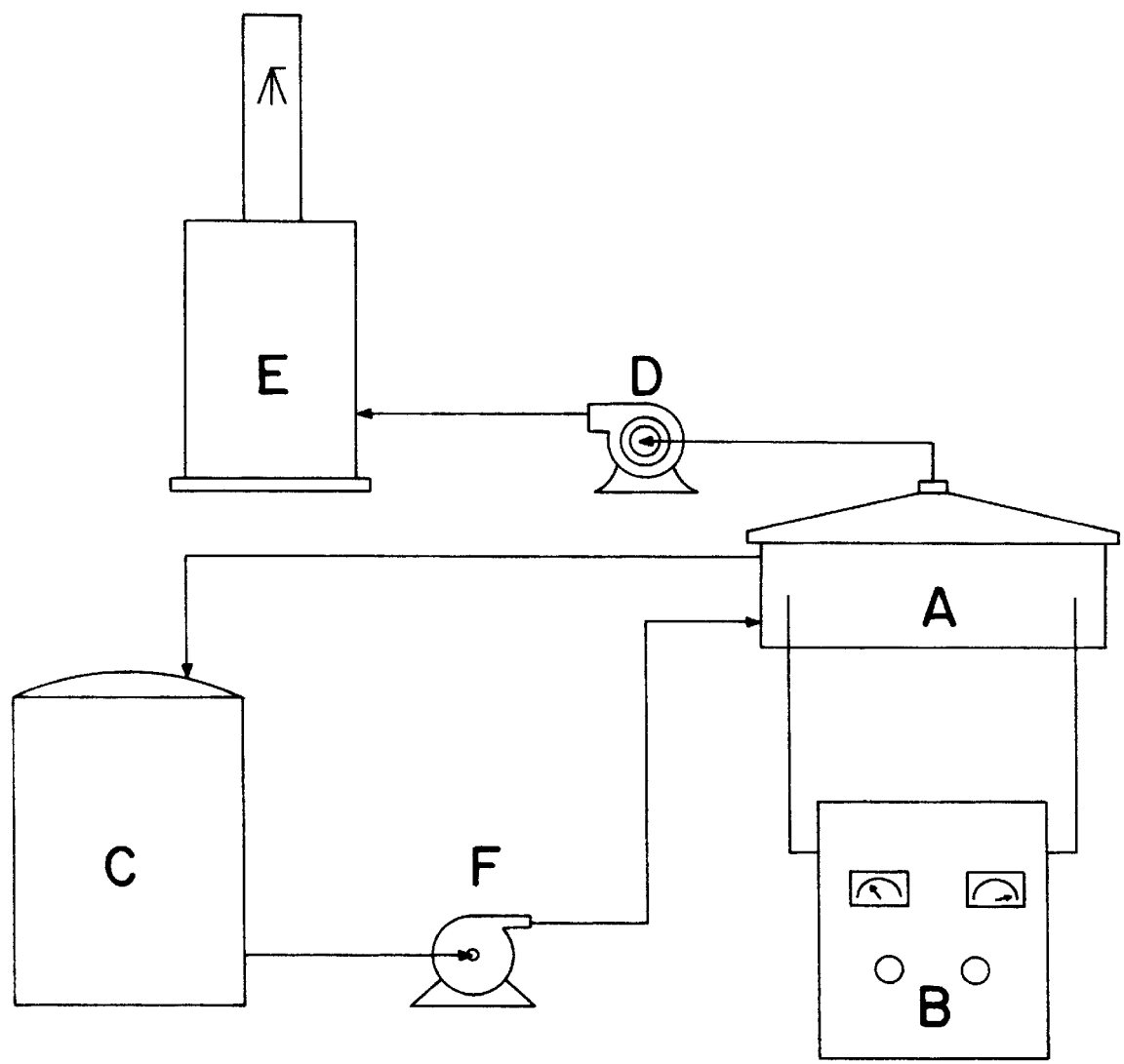
FIG. 1 is a schematic diagram of the apparatus for the electrochemical decomposition of sodium azide.

One object of the present invention is the decomposition of sodium azide in an aqueous alkaline solution by means of an electrolytic cell. The overall chemical reaction is:

$$NaN_3+2H_2O \rightarrow NaOH+NH_3+N_2+\tfrac{1}{2}O_2$$

for all systems except the system where graphite is used as the anode.

The products generated in this reaction, namely, sodium hydroxide and ammonia, are of commercial value and can be collected for sale. The other by-products of this reaction, namely, nitrogen and oxygen, are the atmospheric gases which can be vented and released to the air. Typically the aqueous alkaline solutions contain 1 to 60% by weight of sodium hydroxide.

The apparatus for the electrolytic decomposition of sodium azide has five major parts as shown in FIG. 1, which are: (A) an electrolyzer, (B) a rectifier, (C) a tank, (D) a vacuum system, and (E) a recovery system. It is optional to add a pump (F) between the tank and the electrolyzer to assist in delivering the electrolyte from the tank to the electrolyzer. The apparatus can be configured for continuous flow, recycle flow, or batch operation.

The electrolyzer contains one or more cell units. These cell units are electrically connected in series and are hydraulically connected in series or in parallel. The electrolyzer also contains an anode which is made from iron, nickel, stainless steel, or graphite, and a cathode which is made from iron, stainless steel, titanium, or nickel. The electrode materials can be in either plate or mesh forms.

In an experiment where a graphite anode and a titanium cathode are used in the electrolyzer and the solution contains (weight basis) 50% sodium hydroxide and 2% sodium azide, the following observations are noted: (1) no ammonia is detected in the off gases during electrolysis; (2) among the several types of graphite tested, only the hard pure graphite (type A1 from the Carbide/Graphite Group, Inc.) does not allow the reaction to take place; (3) carbonates build up in the solution; (4) nitrate builds up in the solution to about 2000 ppm and then remains constant; and (5) azide destruction occurs whether the solution is at ambient temperature or at elevated temperatures (75° C.). Similarly, by replacing the cathode with iron, stainless steel, or nickel, similar results to those obtained using a titanium cathode are obtained. By replacing the anode with iron, azide decomposition is also obtained.

In a second experiment where a cathode is made by plating iron from an alkaline solution on a substrate material and an anode is made of nickel, azide decomposition readily occurs in the electrolyzer at ambient temperature. Substrate materials that are successful for use as iron plated cathodes include steel, titanium, stainless steel, and nickel. The substrate which is 316 stainless steel is preferred. By replacing the anode with iron or stainless steel, similar results are obtained. The iron-plated cathode is essential for the chemistry to occur efficiently. Unplated cathodes are not as efficient as plated cathodes. In addition, current efficiency is better at high azide concentration and low sodium hydroxide concentration. Current density was tested from about 0.1 to 0.25 amps per square inch. Lower current density usually results in a system which is larger and more costly. Current efficiency, however, was better at lower current density than at higher current density.

In a third experiment, a monopolar cell using nickel 200 for both the anode and cathode is designed and built. Raney Nickel™ catalyst granules are placed in contact with the cathode. When power is supplied to the electrolyzer, hydrogen gas is generated on the catalyst surface by electrolysis of water. This reaction is also operated at ambient temperature. In addition, the following is noted: (1) sodium azide concentration is reduced below detectable limits; (2) ammonia is in the off gases; (3) at 100% current efficiency, 2 Faradays are required to reduce one mole of sodium azide to ammonia, nitrogen, and sodium hydroxide; and (4) current efficiency decreases with decreased azide concentration. Sodium hydroxide concentration in the range of 10–60%, had no effect on current efficiency. Current density was tested from 0.07 to 1.4 amps per square inch. Current efficiency was better at lower current density than higher current density. This system runs well at about 1 amp per square inch allowing a much smaller system to be used here than in the second experiment. The combined use of nickel anode and nickel cathode which is in electrical contact with Raney Nickel™ granules is the preferable configuration for the decomposition of sodium azide in the electrolyzer.

In operation, the solution to be treated is continuously circulated through the electrolyzer by either gas agitation or via mechanical means with D.C. current applied. The electrolysis continued until the azide has been depleted to the desired concentration. The off gases are removed by the vacuum and are treated in the recovery system where the ammonia is collected in water and the nitrogen and oxygen are released to the atmosphere.

The following example gives typical results from a bench scale experiment utilizing the process described above:

EXAMPLE 1

Electrolyzer: Multiplex, 6 cell units
Cathode: Nickel with 450 grams Raney Nickel™ per cell unit
Anode: Nickel
Electrolyte: 50% (weight basis) NaOH with 10,300 ppm $NaN_3$ at the start and 0.0 ppm $NaN_3$ at the end of the run
Electrolyte Volume: 16.0 liters
Amphrs: 570 (21.2 Faradays)
$NaN_3$ depleted: 230 grams
Current efficiency: 33%

Further variations and modifications of the foregoing will be apparent to those skilled in the art and are intended to be encompassed by the claims appended hereto.

What is claimed is:

1. A process for decomposing sodium azide comprising electrolyzing sodium azide present in an aqueous alkaline solution to decompose said sodium azide to form a resulting aqueous alkaline solution having a reduced amount of sodium azide,
wherein said process results in an overall chemical reaction comprising $NaN_3+2H_2O \rightarrow NaOH+NH_3+N_2+\frac{1}{2}O_2$.
2. The process according to claim 1 further comprising removing off gas formed from said decomposition of said sodium azide.
3. The process according to claim 2 further comprising recovering said off gas.
4. The process according to claim 1 further comprising recycling said resulting aqueous alkaline solution.
5. The process according to claim 4 further comprising pumping off said resulting aqueous alkaline solution.
6. The process according to claim 1
wherein said aqueous alkaline solution comprises 1 to 60% (weight basis) of sodium hydroxide.
7. The process according to claim 1 further comprising removing off gas formed from said decomposition of sodium azide, said off gas comprising ammonia, nitrogen, and oxygen,
collecting said ammonia in water, and
removing said nitrogen and oxygen.
8. The process according to claim 1
wherein said electrolyzing takes place in an electrolyzer having an anode which is a member selected from the group consisting of iron, nickel, stainless steel, and graphite, and a cathode which is a member selected from the group consisting of iron, stainless steel, titanium, and nickel.
9. The process according to claim 8
wherein said anode comprises graphite, and said cathode comprises titanium.
10. The process according to claim 8
wherein said anode is a nickel anode and said cathode is an iron-plated cathode wherein said cathode is a member selected from the group consisting of steel, stainless steel, and nickel.
11. The process according to claim 8
wherein said anode comprises nickel 200, and said cathode comprises nickel 200, said cathode is in contact with Raney nickel granules.
12. The process according to claim 1
wherein said process is a batch process.
13. The process according to claim 1
wherein said process is a continuous process.
14. The process according to claim 1
wherein said process takes place at an ambient temperature.
15. The process according to claim 1 further comprising reducing sodium azide in said resulting aqueous alkaline solution to 0.0 ppm.
16. An apparatus for electrochemically decomposing azide comprising electrolyzer means for electrolyzing sodium azide,
a rectifier for providing D.C. electrical current to said electrolyzer,
a tank in fluid communication with said electrolyzer,
removing means for removing off gas from said electrolyzer, and
a recovery system for recovering ammonia.
17. The apparatus for electrochemically decomposing azide according to claim 16, wherein said electrolyzer further comprises an anode which is a member selected from a group consisting of iron, nickel, stainless steel, and graphite, and a cathode which is a member selected from a group consisting of iron, stainless steel, titanium, and nickel.
18. The apparatus for electrochemically decomposing azide according to claim 17
wherein said anode comprises graphite, and said cathode comprises titanium.

19. The apparatus for electrochemically decomposing azide according to claim 17, wherein said anode and said cathode are in plate or mesh form.

20. The apparatus for electrochemically decomposing azide according to claim 16,
wherein said electrolyzer further comprises a nickel anode and an iron-plated cathode, wherein said cathode is a substrate which is selected from the group consisting of steel, titanium, stainless steel, and nickel.

21. The apparatus for electrochemically decomposing azide according to claim 16, wherein said removing means is for removing ammonia, nitrogen, and oxygen.

22. The apparatus for electrochemically decomposing azide according to claim 16, wherein said cell units of said electrolyzer are connected electrically in series and are hydraulically connected in series or in parallel.

23. The apparatus for electrochemically decomposing azide according to claim 16, further comprising a means for operating said tank and said electrolyzer in recycle, continuous flow, or batch mode.

24. An apparatus for electrochemically decomposing azide according to claim 16, further comprising a pump between said tank and said electrolyzer.

25. An apparatus for electrochemically decomposing azide, comprising:
an electrolyzer containing one or more cell units, and further comprising
an anode comprised of nickel 200, and
a cathode comprised of nickel 200, wherein said cathode is in electrical contact with Raney nickel granules;
a rectifier for providing D.C. electrical current to said electrolyzer;
a tank in fluid communication with said electrolyzer;
removing means for removing off gas from said electrolyzer; and
a recovery system for recovering ammonia.

26. An apparatus for electrochemically decomposing azide, comprising:
an electrolyzer containing one or more cell units,
a rectifier for providing D.C. electrical current to said electrolyzer,
a tank in fluid communication with said electrolyzer,
removing means for removing off gas from said electrolyzer, and
a recovery system for recovering ammonia,
wherein said removing means is for removing ammonia, nitrogen, and oxygen, and
wherein said ammonia recovery system comprises a collecting means for collecting ammonia in water, said recovery system further comprising a treating means for treating said nitrogen and said oxygen in said recovery system, and wherein said apparatus further comprises a releasing means for releasing said nitrogen and said oxygen.

* * * * *